United States Patent [19]

Nichols

[11] 4,151,363

[45] Apr. 24, 1979

[54] METHOD AND APPARATUS FOR JOINING ELECTRICAL CONDUCTORS TO JUNCTION BOXES

[76] Inventor: Wayne L. Nichols, 2921 Euclid Ave., Fort Wayne, Ind. 46806

[21] Appl. No.: 752,403

[22] Filed: Dec. 20, 1976

[51] Int. Cl.² .......................... H02G 3/18; F16H 5/00
[52] U.S. Cl. .................................. 174/65 R; 285/161; 403/195
[58] Field of Search ...................... 174/65 R; 248/56; 285/158, 159, 161; 403/187, 193, 194, 195, 196, 197

[56] References Cited

U.S. PATENT DOCUMENTS

| | | | |
|---|---|---|---|
| 1,131,399 | 3/1915 | McGinley | 174/65 R |
| 2,600,371 | 6/1952 | Bergan | 174/65 R |
| 2,927,807 | 3/1960 | Campbell | 285/158 X |
| 3,659,880 | 5/1972 | Goldsobel | 285/161 |

Primary Examiner—J. V. Truhe
Assistant Examiner—D. A. Tone
Attorney, Agent, or Firm—John A. Young

[57] ABSTRACT

A plastic, electrically nonconductive threaded stem having a central passage integrally related with a flared series of projections also threaded at their outer surface and including a central opening coincident with the passage in the stem.

A ring nut is threadedly mounted over the projections and is advanced toward the free end of the projections to cause the projections to be compressed together and thereby bringing radially inner clamping surfaces of the projections against confronting surfaces of an electrical conductor which is passed through the central passageway in the stem and the flared projections, and thus clamping the two parts together. The threaded stem, in turn, is passed through a companion opening in the junction box and another nut is received over the stem to the junction box between a shoulder of the stem and the nut and thereby holding firmly the conductor relative to the box. The free end of the conductor is within the interior of the box and suitable electrical connections are made by removing insulation from the conductor within the box.

5 Claims, 2 Drawing Figures

METHOD AND APPARATUS FOR JOINING ELECTRICAL CONDUCTORS TO JUNCTION BOXES

BACKGROUND OF THE INVENTION

While there are numerous devices which are designed for holding electrical conductors to junction boxes, they are generally unsatisfactory either because they tend to be expensive in construction or because they are difficult to produce.

In the present invention, there is proposed a single piece device in the form of an integrally related stem and flared projections which are joined together and have a transverse shoulder therebetween.

There is a central aligned passage formed in the projections and stem and through which an insulated conductor projects. The insulated conductor is clamped to the device by a ring nut which commences threading movement at the smaller diameter end of the flared projections and as it advances toward the projected or free ends, such projections are displaced radially inwardly, thus bringing inner surfaces of the projections against the confronting surface of the conductor so that the more the ring nut is advanced the greater the degree of radially inwardly clamping movement of the projections to further develop gripping action between the conductor and the projections. The conductor is thus firmly gripped by the projections of the device. The device, in turn, is held to the junction box by means of the stem which is passed through an opening in the junction box and a second nut is used to fasten the stem to the junction box by clamping a portion of the box between the nut which is received on the stem and a shoulder of the stem. The device thus holds the insulated conductor and the device, in turn, is rigidly connected to the box.

It is therefore an object of the present invention to provide a novel device which is a one-piece construction of plastic, electrically nonconductive material (insulative material) such as Delren, polyethylene or the like, adapted to clamp such conductor by means of flared projections biased inwardly by a ring nut, and, an integrally related stem which is passed through and thereafter clamped by a companion nut to the junction box.

DETAILED DESCRIPTION OF THE DRAWINGS

Figure 1:
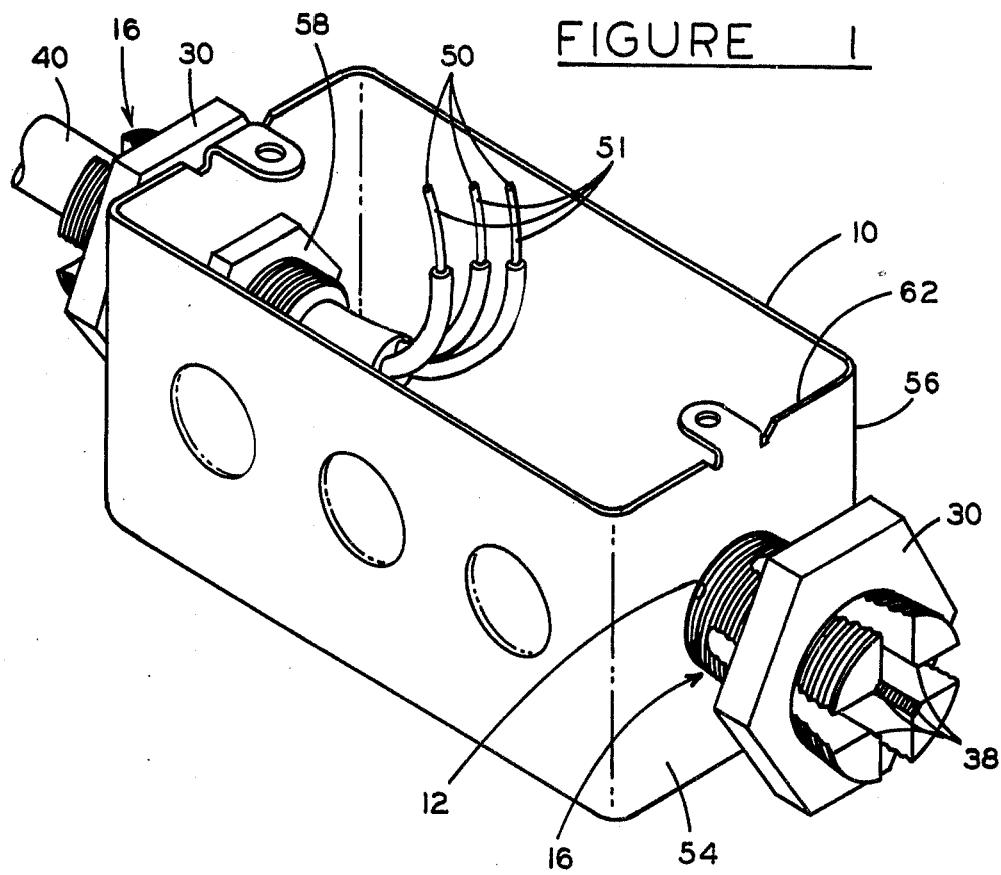
Figure 2:
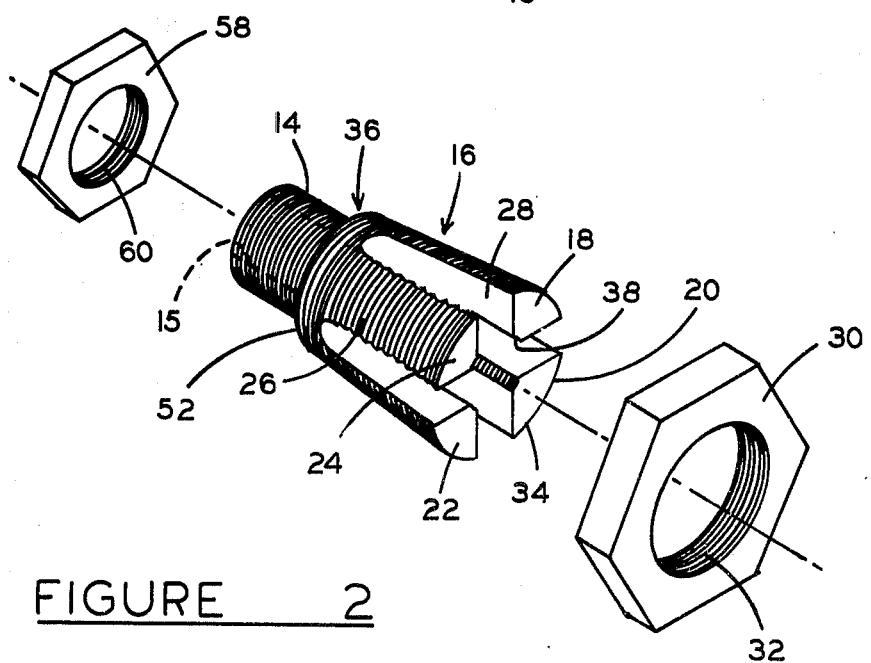

In the drawings:

FIG. 1 is an isometric view of the clamping member in position on the junction box and having a conductor in operative position, clamped to the junction box through said adapter; and FIG. 2 is an isometric exploded view of the clamping member shown detached from the junction box.

DETAILED DESCRIPTION OF THE INVENTION

A junction box 10 has an opening 12 through which is received threaded stem 14 having a central opening 15, the stem 14 being a part of a clamping device 16. The clamping device 16 constitutes, in addition to the threaded stem 14, a number of flared projections 18, 20, 22 and 24 having threads 26 at outer surfaces thereof. Threads 26 are formed complementary, although each projection is separated by a gap 28 so that a ring nut 30 having internally threaded opening 32 is threadedly joined to the threads 26 of the projections. The inner diameter of the threaded opening 32 is approximately the same as the outer threaded diameter of the projections at end 36 so that as the ring nut 30 is advanced toward the projected ends 34 the radially inner surfaces 38 of the projections, which can either be knife-edged, serrated and the like, are caused to be drawn radially inwardly and press against the outer surface 40 of the insulation coating of a conductor cable 50. There is thus formed a clamping relationship between the confronting surfaces of 38 and 40.

Stem 14 passes through opening 12 until shoulder 52 is brought against surface 54 of end wall 56 of box 10.

The stem 14 threadedly receives a nut 58 having a threaded opening 60 which is received on the stem 14 and the nut 58 is turned down until the nut engages the inner surface 62 of the wall 56 and thereby clamping the device 16 firmly in place by gripping the wall 56 between the nut 58 on the inner surface of the wall and the shoulder 52 on the outer surface of the wall.

Before passing the threaded stem 14 through the opening 12, the ring nut 30 is passed over the stem and toward projections 18, 20, 22 and 24, so that it is at least started threadedly on the smaller diameter end of the outer surfaces of these projections. Once the ring nut 30 is started, the stem 14 is then passed through the opening 12.

OPERATION

In operation, after the ring nut 30 is passed over the stem 14 so that it just starts threadedly on the companion threads of the projections 18, 20, 22 and 24, the insulated conductor 50 is passed through the coaxially aligned opening 15 of the stem and the unnumbered but defined opening formed by the projections 18, 20, 22 and 24.

The conductor 50 has free ends 51 which are received in the box 10 and the ring nut 30 is next advanced, drawing the projections 18–24 inwardly and clamping the respective surfaces 38 against the confronting insulation surface 40. The ring nut 30 is advanced to whatever degree is necessary to embed surfaces 38 into the insulation 40 to make a reliable grip between surfaces 38 and 40 and at four locations around the periphery of the insulation 40 extending for a length defined by the longitudinal dimension of surfaces 38.

The stem 14 is then held in place by means of tightening down the nut 58, the nut being received on the stem 14. The nut 48 is turned down until the device is firmly clamped by the nut 58 and the shoulder 52 to the wall 54 at the box 10.

The device 16 can be constructed of any electrically insulative material and a few selected examples of suitable materials are polyethylene, Delren, Teflon, polypropylene, and the like. These are examples of materials which possess the necessary strength, resiliency and insulative properties as well as manufacturability of materials so that the part can be either molded or otherwise formed into a suitable product by injection molding or the like.

Although the present invention has been illustrated and described in connection with a single example embodiment, it will be understood that this is illustrative of the invention and is by no means restrictive thereof. It is reasonably to be expected that those skilled in this art can make numerous revisions and adaptations of the invention, and it is intended that such revisions and adaptations will be included within the scope of the following claims as equivalents of the invention.

What is claimed is:

1. In combination with a junction box, an improved connector device for joining electrical conductors to such junction boxes and the like comprising a threaded stem having a shoulder, a central through passage means forming an opening in the junction box and receiving the stem therethrough, with said shoulder in seated relation against the outer surface of the junction box, a plurality of radially inwardly compressible members integrally related with said stem and flaring outwardly toward their free ends and threaded at the outer surface thereof for receiving a ring nut thereon which, as it threadedly advances, effects inwardly compressing action on said flared members, means forming a longitudinal passage centrally of said members and disposed coaxially relative to the opening in said stem whereby an electrical conductor can be passed successively therethrough, gripping surfaces at the radially inner portions of said projections engageable against confronting surfaces of the conductor responsively to movement of the ring nut urging radially inward movement of said projections thereby to effect gripping connections between the conductor and said gripping surfaces with the conductor having a free end projecting within said junction box, and a second nut threadedly received over said stem to clamp a portion of the junction box between said second nut and said shoulder and thereby holding the device and its attached conductor rigidly in place.

2. The construction in accordance with claim 1 wherein said member is constructed of plastic material and is electrically insulative in composition.

3. The clamping member in accordance with claim 1 wherein the direction of rotation of said ring nut in the advancing direction effecting clamping of the projections is in a direction tending to effect further locking threadable movement of said second nut on said stem thereby to maintain the two in clamped positions as the ring nut is moved in an advancing direction.

4. A process for mounting electrical conductors in junction boxes and the like comprising the steps of passing an electrical conductor through aligned openings in a threaded stem and a plurality of circumferentially disposed flared resilient members having a ring nut thereon and adjustable by radially inwardly clamping movements of said resilient members against said conductor, mounting the threaded stem by means of a nut in fixed position onto a junction box through an opening proportioned to receive said threaded stem, and thereafter advancing the ring nut toward the free or projected ends of said flared members to bias them in a radially inward sense and forcibly clamp the confronting surfaces of said projections against said electrical conductor to hold the two parts together.

5. The process in accordance with claim 4 in which the ends of the retained electrical conductor are received within the junction box and are stripped of electrical insulation to provide suitable electrical connections within said junction box.

* * * * *